United States Patent
Aoki et al.

(10) Patent No.: US 8,540,308 B2
(45) Date of Patent: Sep. 24, 2013

(54) STOWABLE VEHICLE SEAT

(75) Inventors: Kazuya Aoki, Tochigi (JP); Tatsuo Sayama, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 407 days.

(21) Appl. No.: 12/918,221

(22) PCT Filed: Feb. 17, 2009

(86) PCT No.: PCT/JP2009/052662
§ 371 (c)(1),
(2), (4) Date: Aug. 18, 2010

(87) PCT Pub. No.: WO2009/104587
PCT Pub. Date: Aug. 27, 2009

(65) Prior Publication Data
US 2010/0320824 A1   Dec. 23, 2010

(30) Foreign Application Priority Data
Feb. 19, 2008   (JP) .................. 2008-037612

(51) Int. Cl.
*B60N 2/32* (2006.01)
*B60N 2/02* (2006.01)

(52) U.S. Cl.
USPC .......... 297/15; 297/326; 297/335; 296/65.09; 296/66

(58) Field of Classification Search
USPC ................... 297/15; 296/65.09, 66
See application file for complete search history.

(56) References Cited

U.S. PATENT DOCUMENTS

| 6,158,800 | A | * | 12/2000 | Tsuge et al. ............... 296/65.09 |
| 6,896,309 | B2 | * | 5/2005 | Satoh et al. ................ 296/65.09 |
| 7,066,539 | B2 | * | 6/2006 | Hatta et al. ................ 297/344.14 |
| 7,252,320 | B2 | * | 8/2007 | Tsujibayashi et al. ..... 296/65.09 |
| 7,273,254 | B2 | * | 9/2007 | Fujita et al. ................... 297/331 |
| 7,377,582 | B2 | * | 5/2008 | Fukada et al. .................. 297/15 |

FOREIGN PATENT DOCUMENTS

| JP | 58-203241 A | 11/1983 |
| JP | 2003-054297 A | 2/2003 |
| JP | 2006-082698 A | 3/2006 |
| JP | 2006-082706 A | 3/2006 |

* cited by examiner

*Primary Examiner* — David Dunn
*Assistant Examiner* — Tania Abraham
(74) *Attorney, Agent, or Firm* — Drinker Biddle & Reath LLP

(57) ABSTRACT

A stowable vehicle seat with improved operability is configured so that a stowing and restoring operation can be performed by rotating seat support parts and provided on the rear end part of a seat cushion in the front and rear direction around the rotating center. The seat support part is provided with a rotating shaft provided on the seat cushion side, a rotating shaft bracket pivotally supporting the rotating shaft on the vehicle body floor side, and spiral springs one end part side of which is always locked to the rotating shaft side and which urges in the restoration rotating direction. The other end part side of the spiral springs is locked to the vehicle body floor side at different predetermined angles of the seat cushion.

5 Claims, 18 Drawing Sheets

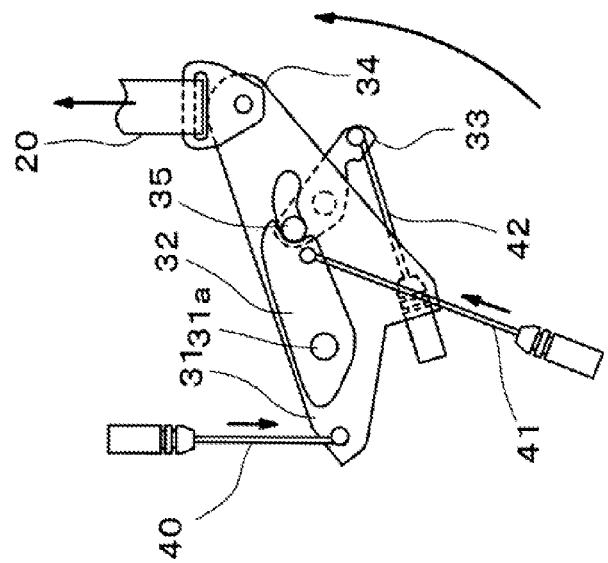
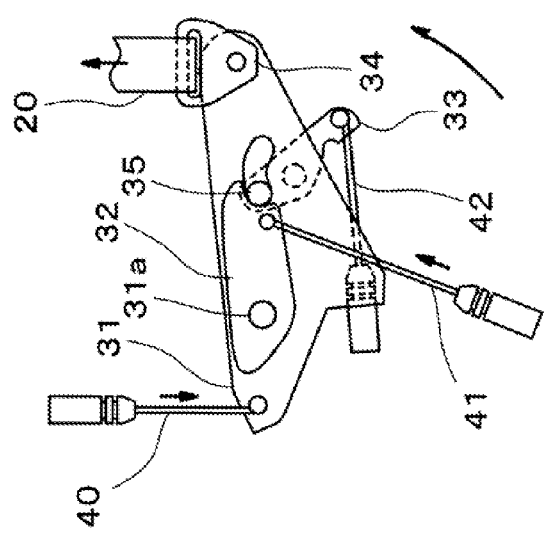
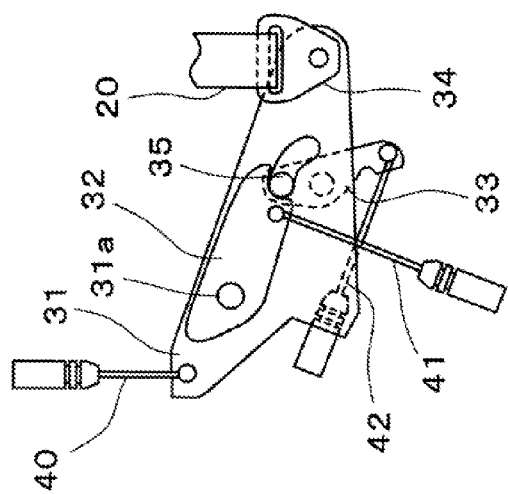

STOWABLE VEHICLE SEAT

CROSS REFERENCE TO RELATED APPLICATIONS

This application is the U.S. national phase of the International Patent Application No. PCT/JP2009/052662 filed Feb. 17, 2009, which claims the benefit of Japanese Patent Application No. 2008-037612 filed Feb. 19, 2008, the entire content of which is incorporated herein by reference.

BACKGROUND

The present invention relates to a stowable vehicle seat and, more particularly, to a stowable vehicle seat with improved operability.

Conventionally, stowable seats for automobile are known. There is available, for example, a technique in which—in a state in which a rear end part of a seat cushion constituting a vehicle seat is supported on a front side of a stowage recess (storage recess) in a vehicle body floor to be rotatable in a front and rear direction, and a seat back is folded over the seat cushion—the vehicle seat is rotated to the rear and stowed in the stowage recess.

That is to say, as disclosed in Japanese Unexamined Patent Application Publication No. 2006-82698 ("the '698 Application"), rotating shafts provided in the right and left sides of the rear end part of the seat cushion are supported by brackets provided in both edge parts at the right and left on the front side of the stowage recess so that the rear end part of the seat cushion is rotatable in the front and rear direction, whereby the seat is stowable in the stowage recess.

The technique described in the '698 Application has a disadvantage that although the setting (restoring) operation load of seat is reduced by the mounting of a spiral spring for urging the seat cushion in a setting direction (restoration rotating direction) in a support part, the operation load in the reverse rotating direction (stowage rotating direction) cannot be reduced.

Also, the technique has a disadvantage that unless a damping damper is mounted, it is difficult to achieve a sense of operation that gives a sense of security because the rotating speed at the time of restoration and stowage is high.

SUMMARY

Various embodiments of the invention have been made to solve the above problems, and accordingly an object thereof is to provide a stowable vehicle seat in which the operation load and the rotating speed are reduced in both the restoring and stowing operations, and the sense of security at the time of seat operation and the product quality are improved.

To achieve the above object, an embodiment of a stowable vehicle seat includes a first seat support for rotatably supporting one end part side of a seat cushion; a seat back foldable over the seat cushion via a reclining assembly; a second seat support provided on an other end part side of the seat cushion; engaging and disengaging elements that engage and disengage the second seat support with and from a vehicle body floor side; and urging elements mounted to the first seat support that urge the seat cushion to the restoration rotating direction, wherein the urging elements comprise a plurality of urging springs having one end part always locked to the seat cushion side and an other end part engageable with and disengageable from the vehicle body floor side when a rotating angle of the seat cushion is at a position of a predetermined angle, each of which has the same urging direction and different predetermined angle; and the urging force of the urging elements is changed stepwise according to the rotating angle of the seat cushion.

Thus, the stowable vehicle seat includes the first seat support for rotatably supporting one end part side of the seat cushion and the urging element(s) mounted to the first seat support that urges the seat cushion to the restoration rotating direction, and is configured so that the urging element(s) has one end part always locked to the seat cushion side and an other end part engageable and disengageable from the vehicle body floor side when a rotating angle of the seat cushion is at a position of a predetermined angle, whereby the urging force applied to the seat cushion is changeable with the predetermined angle. Therefore, the operation load is reducible, and the rotating speed is properly adjustable.

It is preferable that the urging element(s) have a plurality of urging springs having different predetermined angles. It is preferable that the urging spring consists of a plurality of urging springs having the same urging direction.

Since the urging element(s) has the plurality of urging springs each having a different predetermined angle and the same urging direction as described above, the urging force is changeable to several stages according to the rotating angle. In an embodiment, the urging elements include a first urging spring, the other end part of which is locked to the vehicle floor side at a first predetermined angle; a second urging spring, the other end part of which is locked to the vehicle floor side at a second predetermined angle; and a third urging spring, the other end part of which is locked to the vehicle floor side at a third predetermined angle, the first predetermined angle being 0 degrees; the second predetermined angle being in an angle range of 20 to 30 degrees, and the third predetermined angle being in an angle range of 50 to 60 degrees. Therefore, the urging force and the rotating speed is properly changeable according to the rotating angle in the restoration rotating operation.

It is preferable that the urging element(s) have at least one urging spring whose urging direction is either one side of the stowage rotating direction and the restoration rotating direction and at least one urging spring whose urging direction is the other side of the stowage rotating direction and the restoration rotating direction.

Since the urging element(s) has at least one urging spring whose urging direction is either one side of the stowage rotating direction and the restoration rotating direction and at least one urging spring whose urging direction is the other side of the stowage rotating direction and the restoration rotating direction as described above, the urging force is changeable to several stages according to the rotating angle in both the rotating directions of the stowage rotating direction and the restoration rotating direction.

Since the urging force applied to the seat cushion is changed with the predetermined angle, the operation load is reduced, and the rotating speed is adjusted properly, so that a stowable vehicle seat with an improved sense of security at the seat operation time is provided.

Since the urging springs the other end part of which is locked at different predetermined angles are used, the urging force is changeable to several stages according to the rotating angle. Therefore, the operation is performed smoothly, and a stowable vehicle seat with an improved sense of security at the operation time is provided.

Since the urging force is changeable to several stages according to the rotating angle in both the rotating directions of the stowage rotating direction and the restoration rotating direction, the operation is smoothly performable, and a stowable vehicle seat with an improved sense of security at the operation time is provided.

Since the urging force and the rotating speed are properly changeable according to the rotating angle in the restoration rotating operation, the operation load is reduced, and the rotating speed is adjusted properly, so that a stowable vehicle seat with an improved sense of security at the seat operation time is provided.

BRIEF DESCRIPTION OF DRAWINGS

FIGS. 16A-C are explanatory side views of operation of a link mechanism at the time of stowing operation of a stowable vehicle seat in accordance with one embodiment of the present invention;

DETAILED DESCRIPTION

One embodiment of the present invention will now be described with reference to the accompanying drawings. The members, arrangements, and the like described below do not restrict the present invention, and can be modified and changed variously in light of the teachings of the present invention.

First, the configuration of a seat S, S1 in accordance with this embodiment is explained with reference to FIGS. 1 to 8.

A vehicle equipped with the seat S of this embodiment has three-row seats arranged in the front and rear direction, and the seat of the third row is stowable. At the rear of the seat S, a stowage recess 5 serving as a stowing area for stowing the seat S is provided in a vehicle body floor 4. On the vehicle body floor 4, a floor carpet (not shown) is laid throughout almost the entire surface thereof.

In the description below, the right-hand side and the left-hand side showing the direction are referred to with respect to the vehicle travel direction.

The seat S has three seats in the right and left direction, and is configured by a right seat S1 for two persons, which is located on the right-hand side with respect to the vehicle travel direction, and a left seat S2 for one person.

Also, since the stowage mechanisms and operating methods of the right seat S1 and the left seat S2 are the same, the right seat S1 is considered below as the seat S.

Figure 1:
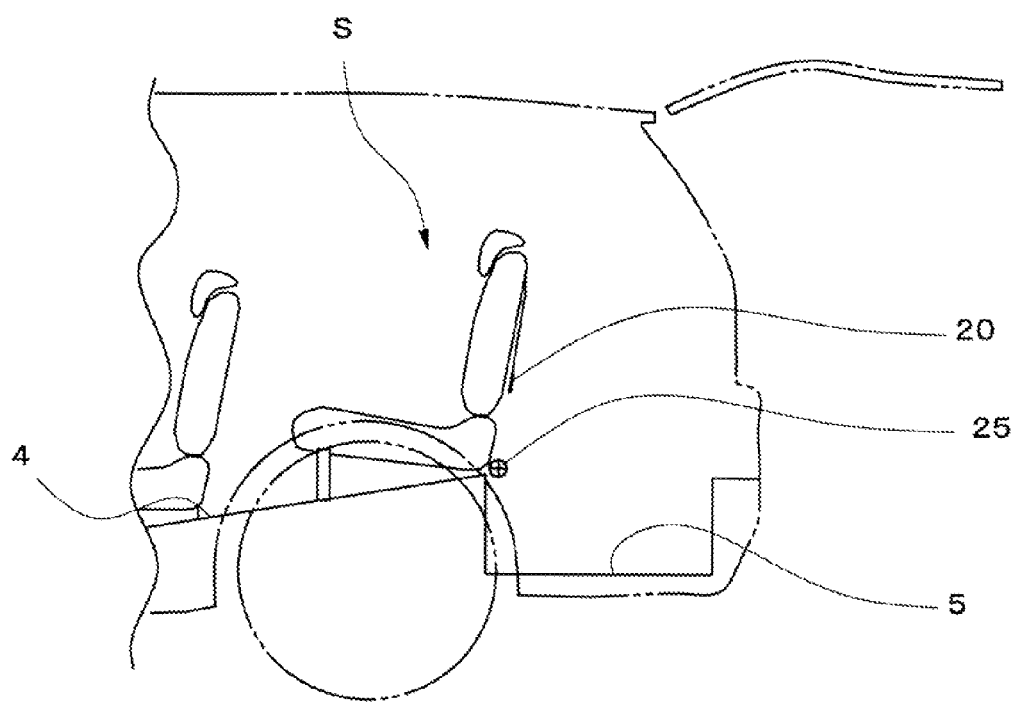
FIG. 1 is a schematic side view of a vehicle rear part equipped with a stowable vehicle seat in accordance with one embodiment of the present invention.
Figure 2:
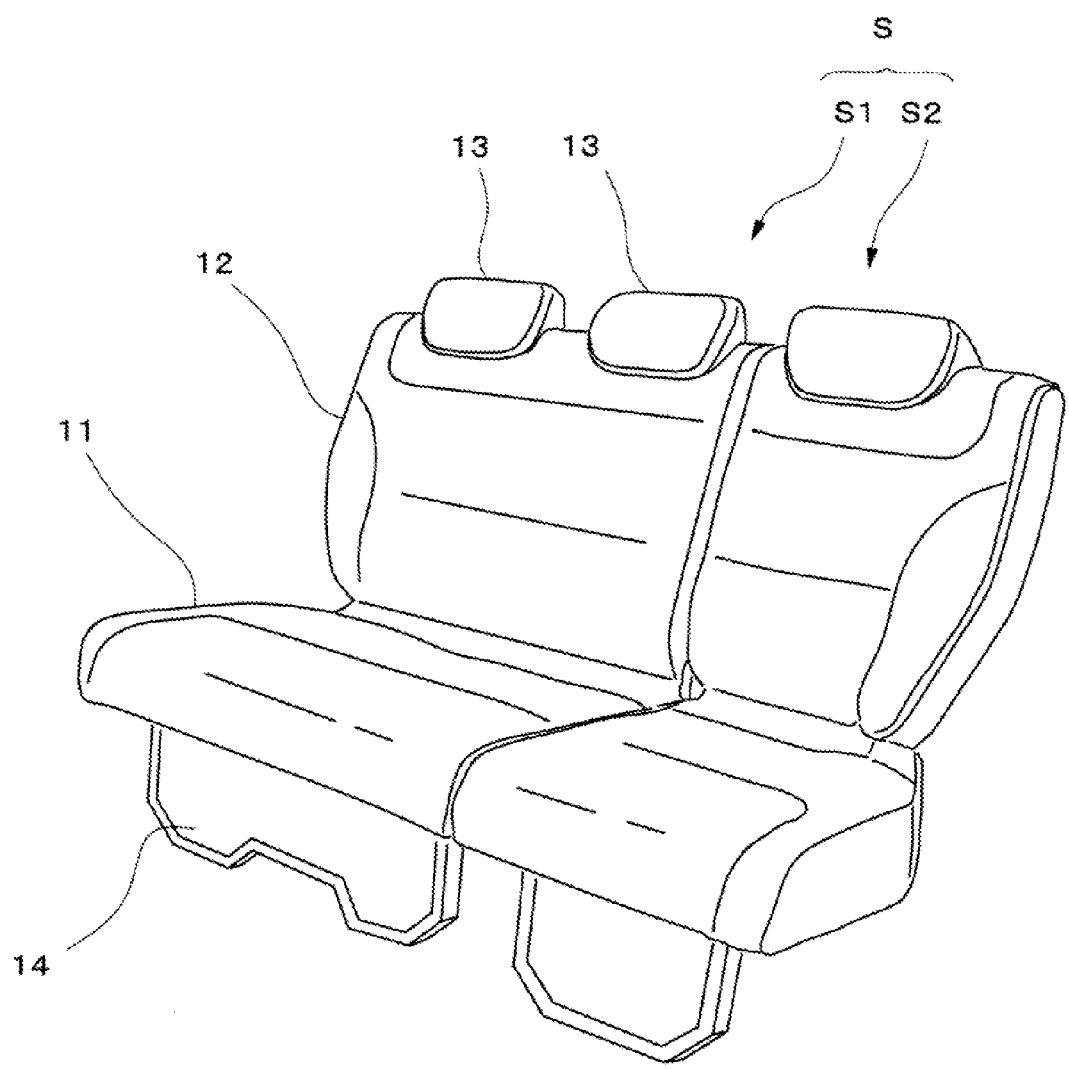
FIG. 2 is a front perspective view of a stowable vehicle seat in accordance with one embodiment of the present invention.
Figure 3:
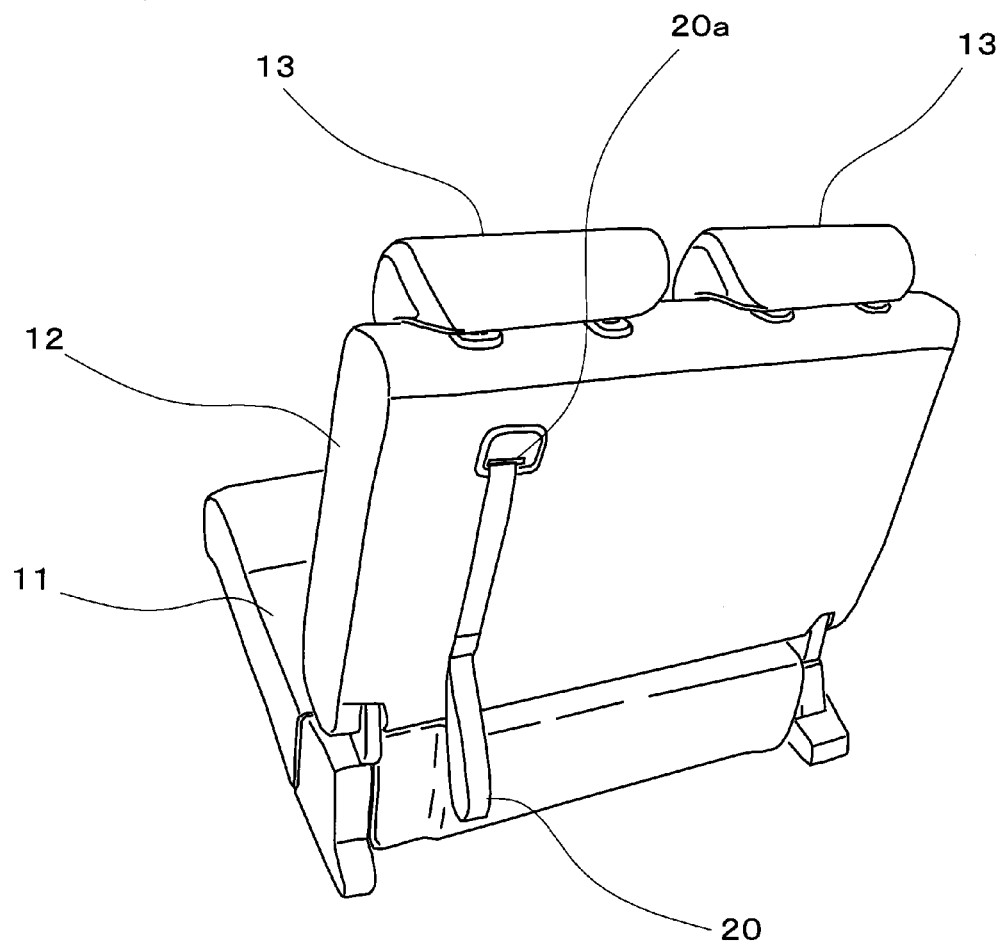
FIG. 3 is a rear perspective view of a stowable vehicle seat in accordance with one embodiment of the present invention.

The seat S is made up of a seat cushion 11, a seat back 12, headrests 13, 13 and a front leg 14. Also, as shown in FIG. 3, from the back side of the seat back 12, a strap 20 serving as an operating element for performing the stowing and restoring operation of the seat S is extended from the back side of the seat back 12 to the outside through a strap outlet part 20a.

For the seat S in accordance with this embodiment, the operating element for a reclining locking releasing mechanism and a leg locking releasing mechanism that are operated when the stowable vehicle seat is stowed and restored are integrated into one as the strap 20.

The strap 20 is an operating element operated at the time of stowing and restoring operation of the seat S, and is formed by a flexible wide belt having a length of about 1 m to facilitate operation performed by a passenger. The stowing and restoring operation of the seat S is performable by a pulling operation of the strap 20, so that the operation load is reducible as compared with the operation using a lever. In the state in which the stowing and restoring operation of the seat S is not performed, a part of the strap 20 is hooked to a planar fastener on the back surface of the seat back 12.

In this embodiment, the strap 20 serving as the operating element is of a belt form. However, the strap 20 may be formed in a string form or a pulling lever form.

Figure 4:
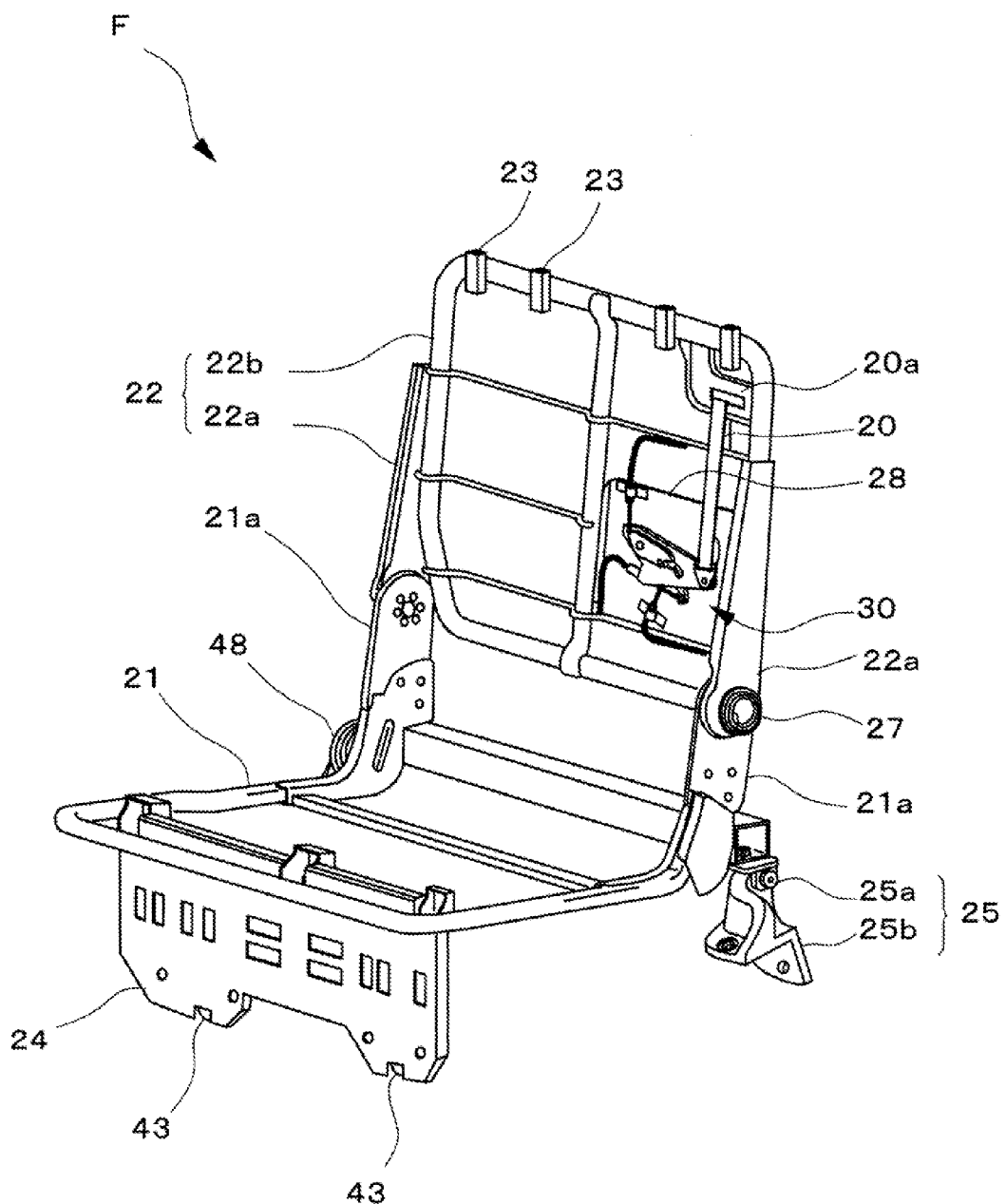
FIG. 4 is a schematic perspective view of a seat frame in accordance with one embodiment of the present invention.

A seat frame F of the seat S shown in FIG. 4 includes a seat cushion frame 21 constituting the seat cushion 11, a seat back frame 22 constituting the seat back 12, and a front leg frame 24. The seat cushion frame 21 and the seat back frame 22 are connected to each other via a reclining mechanism 27, and the seat cushion frame 21 and the vehicle body floor 4 side are connected to each other via seat support parts 25 and 26. Also, in the upper part of the seat back frame 22, pillars for headrest frames (not shown) are disposed via pillar support parts 23.

The seat cushion frame 21 is used to constitute the seat cushion 11 that is covered by a cushion pad, a cover, or the like (not shown), and supports the passenger from the lower side. The front side of the seat cushion frame 21 is supported on the vehicle body floor 4 side by the front leg frame 24. Also, in the rear end part of the seat cushion frame 21, back frame support parts 21a, 21a connected to the seat back frame 22 are provided.

The rear end part side of the seat cushion frame 21 is supported by the seat support parts 25 and 26 to be rotatable in the front and rear direction.

The seat back frame 22 is used to constitute the seat back 12 that is covered by a cushion pad or the like (not shown) and supports the passenger's back from the rear, and, in this embodiment, comprises a substantially rectangular frame body. More specifically, the seat back frame 22 is formed by two side frames 22a, 22a which are disposed to be separate in the right and left direction and extend in the up and down direction, and a central frame 22b, which is the substantially rectangular frame body held between the side frames 22a, 22a.

On the seat back frame 22 and the seat cushion frame 21, a stowage locking mechanism 70 is provided.

The lower end part side of the side frame 22a, 22a is connected to the back frame support part 21a, 21a via a reclining mechanism 27 serving as a reclining assembly.

On the inside of the central frame 22b, which is the frame body, a substantially plate-shaped back plate 28 is disposed along the plane for supporting the passenger's back, and on the back plate 28, a link mechanism 30, described below, is provided. Also, the strap outlet part 20a is provided in the upper part of the central frame 22b.

The front leg frame 24 is used to constitute the front leg 14 that is covered by a cover material (not shown) and serves as a second seat support, and is connected to the vehicle body floor 4 side to support the front side of the seat cushion frame 21. The upper part of the front leg frame 24 is supported on the front side of the seat cushion frame 21 to be rotatable in the front and rear direction, and, in the lower part of the front leg frame 24, locking claws 43, 43 that are connected to a leg striker 44 provided on the vehicle body floor 4 side to be engageable and disengageable, are provided at two places. In this embodiment, the configuration is made such that the locking claws 43 are provided at two places at the right and left. However, the configuration may be made such that either one of the right and left locking claws 43 is provided, or one locking claw 43 is provided at one place in the central portion.

The seat support parts 25 and 26, which serve as a first seat support, are formed in a pair at the left and right, and each of the seat support parts 25 and 26 is made up of a rotating shaft 25a, 26a serving as a shaft member attached to the right and left on the rear end part side of the seat cushion frame 21, and a rotating shaft bracket 25b, 26b serving as a vehicle body-side bracket rotatably supporting the rotating shaft 25a, 26a on the vehicle body floor 4 side. In the seat support part 26 on one side of the left and right seat support parts 25 and 26, spiral springs 46, 47, and 48 for urging the seat cushion 11 to the rotating direction are mounted. In this embodiment, the configuration is made such that the urging springs are provided only on one side of the seat support parts 25 and 26. However, the configuration may be made such that the urging elements are provided on either side or the urging springs are provided on both sides.

Figure 5:
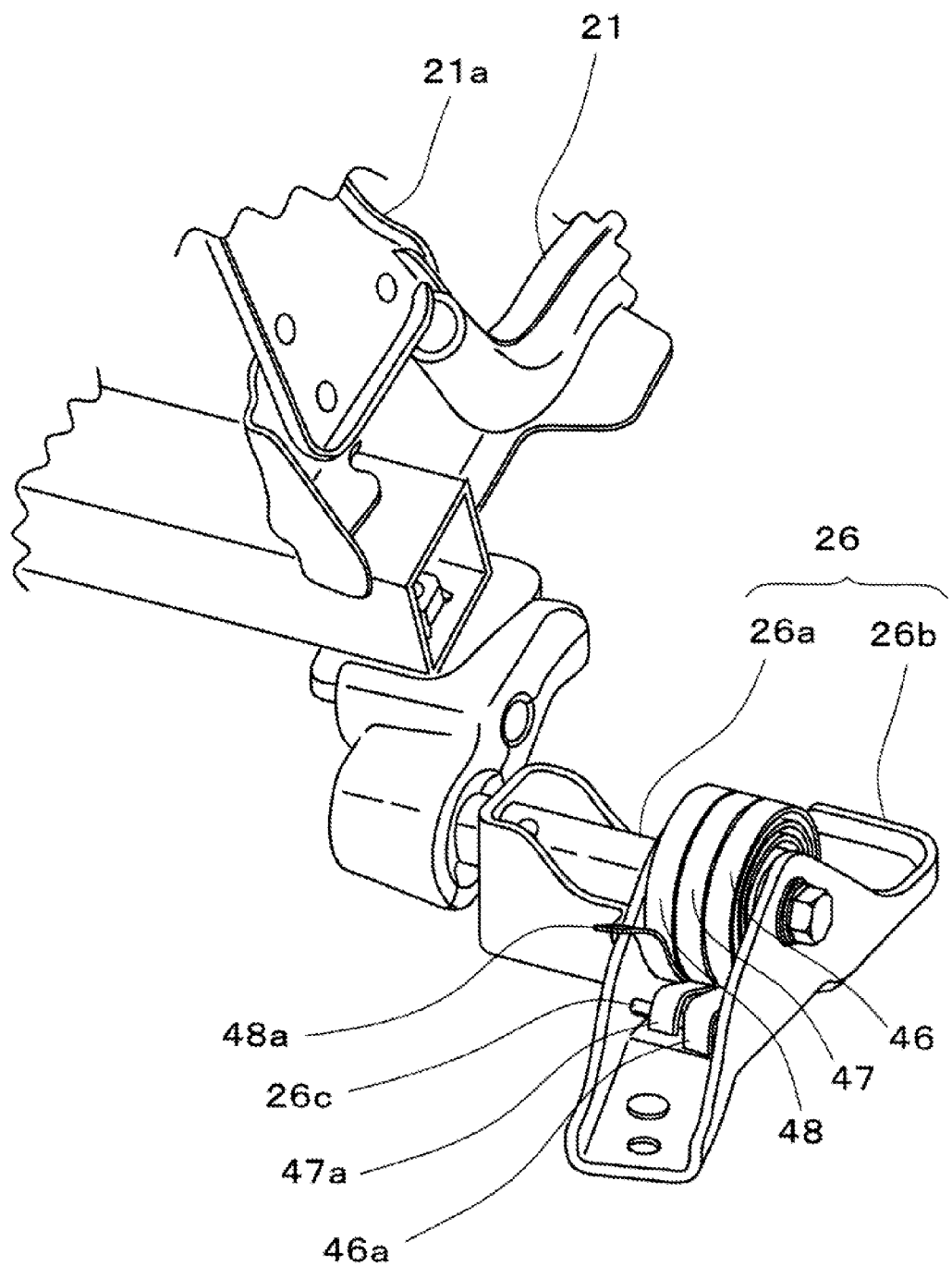
FIG. 5 is an enlarged explanatory perspective view of a seat support part in accordance with one embodiment of the present invention.
Figure 6:
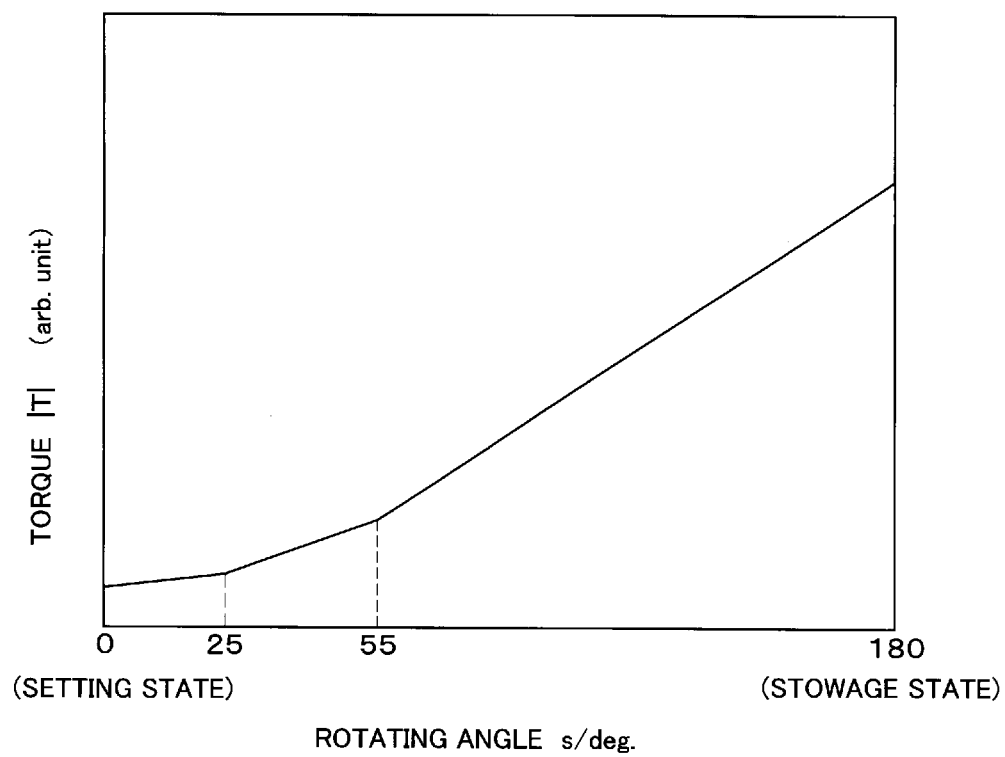
FIG. 6 is a graph showing the relationship between rotating angle and torque in a first working example relating to a seat support part in accordance with one embodiment of the present invention.

Hereunder, the seat support part 26 is explained with reference to FIGS. 5 and 6. FIGS. 5 and 6 show a first working example relating to the seat support part 26.

First, the configuration of the seat support part 26 is explained with reference to FIG. 5. The configuration is made such that the urging element is provided on one side only of the paired seat support parts 25 and 26 mounted to the rear end part of the seat cushion frame 21. The side on which the urging element is provided is referred to as the seat support part 26. On the rotating shaft bracket 26b of the seat support part 26, the urging spring is provided. The urging spring is formed by three spiral springs 46, 47, and 48 provided in parallel.

For each of the spiral springs 46, 47, and 48 serving as the urging springs, the inside end part (internal hook) side thereof is mounted to the rotating shaft bracket 26a that urges the seat S side to the front rotating direction (restoration rotating direction). Therefore, the spiral springs 46, 47, and 48 rotate together with the rotating shaft 26a.

On the outside end part (external hook) 46a, 47a, 48a side, the position of the external hook is adjusted to be locked to a locking pin 26c on the rear side of the rotating shaft bracket 26b successively according to the rotating angle of the seat cushion 11.

Each of the spiral springs 46, 47, and 48 is explained.

The external hook 46a of the spiral spring 46 is locked to the locking pin 26c even in the state in which the seat cushion 11 is set (the rotating angle)0°. Therefore, the spiral spring 46 always urges the seat cushion 11 to the restoration direction.

For the external hook 47a of the spiral spring 47, the number of turns of the spiral spring 47 is adjusted so that the external hook 47a is locked to the locking pin 26c in the state in which the seat cushion 11 rotates 25° from the setting state to the stowage rotating direction. Therefore, the spiral spring 47 can urge the seat cushion 11 to the restoration direction on the storage rotating side of the locked angle.

For the external hook 48a of the spiral spring 48, the number of turns of the spiral spring 48 is adjusted so that the external hook 48a is locked to the locking pin 26c in the state in which the seat cushion 11 rotates 55° from the setting state to the stowage rotating direction. Therefore, the spiral spring 48 can urge the seat cushion 11 to the restoration direction on the storage rotating side of the locked angle.

Assuming that the rotating angle s of the seat cushion 11 is 0° in the setting state, and 180° in the stowage state, in this working example, the angle at which the external hook 46a of the spiral spring 46 is locked to the rotating shaft bracket 26b side is 0°, and similarly, the angle for the spiral spring 47 is 25° and the angle for the spiral spring 48 is 55°.

Also, the spring urge angle range is 0 to 180° for the spiral spring 46, 25 to 180° for the spiral spring 47, and 55 to 180° for the spiral spring 48.

However, the angle at which the external hook 47a, 48a of the spiral spring 47, 48 is locked to the rotating shaft bracket 26b side is not limited to the above-described angle, and the same effect is achieved in an angle range of some degree. For example, the angle for the spiral spring 47 can be set arbitrarily in the range of 10 to 40°, preferably 20 to 30°, and the angle for the spiral spring 48 can be set arbitrarily in the range of 40 to 70°, preferably 50 to 60°.

Next, the relationship between the rotating angle of the seat cushion 11 and the urging force shown in FIG. 6 is explained.

As described above, the rotating angle s represents the rotating angle of the seat cushion 11. The rotating angle in the setting state of the seat cushion 11 (seat S) is taken as 0° and that in the stowage state is taken as 180°. The torque |T| in FIG. 6 is the absolute value of the urging force T in any rotating direction caused by the urging spring, and represents the magnitude of urging force not considering the urge direction.

The urging force actually applied to the seat cushion 11 is the integrated value (composite torque) of the urging forces of the spiral springs 46, 47, and 48.

Since the spiral springs 46, 47, and 48 each have a different urge range, the composite torque has bends as shown in FIG. 6. First, the spiral spring 46 has an urging force in the entire angle range. The spiral spring 47 exerts the urging force at angles not smaller than 25°, so that the torque of the spiral spring 47 is added to the torque of the spiral spring 46 in a rotating angle range of 25 to 180°. Further, the spiral spring 48 exerts the urging force at angles not smaller than 55°, so that the torque of the spiral spring 48 is integrated to the composite torque of the spiral springs 46 and 47 in a rotating angle range of 55 to 180°.

By disposing the spiral springs 46, 47, and 48 in this manner, in the restoring operation from the stowage state, the urging forces of the three spiral springs 46, 47, and 48 are exerted in the angle range in which a large force is required immediately after the operation start, so that the operation load is reduced. Also, after the middle of the restoring operation, the urging springs exerting the urging force decrease, so that the urging force weakens, and therefore the increase in rotating speed is restrained.

In the above-described embodiment, the three spiral springs 46, 47, and 48 are used for urging. However, by increasing the number of springs having a different urge angle, the number of stages at which the urging force changes is increased. Therefore, if a still larger number of urging springs are used, a torque characteristic in which torque rises in a form of quadratic curve with respect to the rotating angle is obtained.

Also, for the spiral springs 46, 47, and 48, although the number of turns is different, other particulars such as the plate thickness and width are the same. However, by using the spiral springs each having different particulars, the urging force is adjustable. For example, by increasing the plate thickness and width of the spiral spring 46, the urging force immediately after the restoring operation is increased, whereby the operation load is reduced significantly.

Hereunder, other working examples relating to the seat support part 26 are explained with reference to FIGS. 7 and 8.

Figure 7:
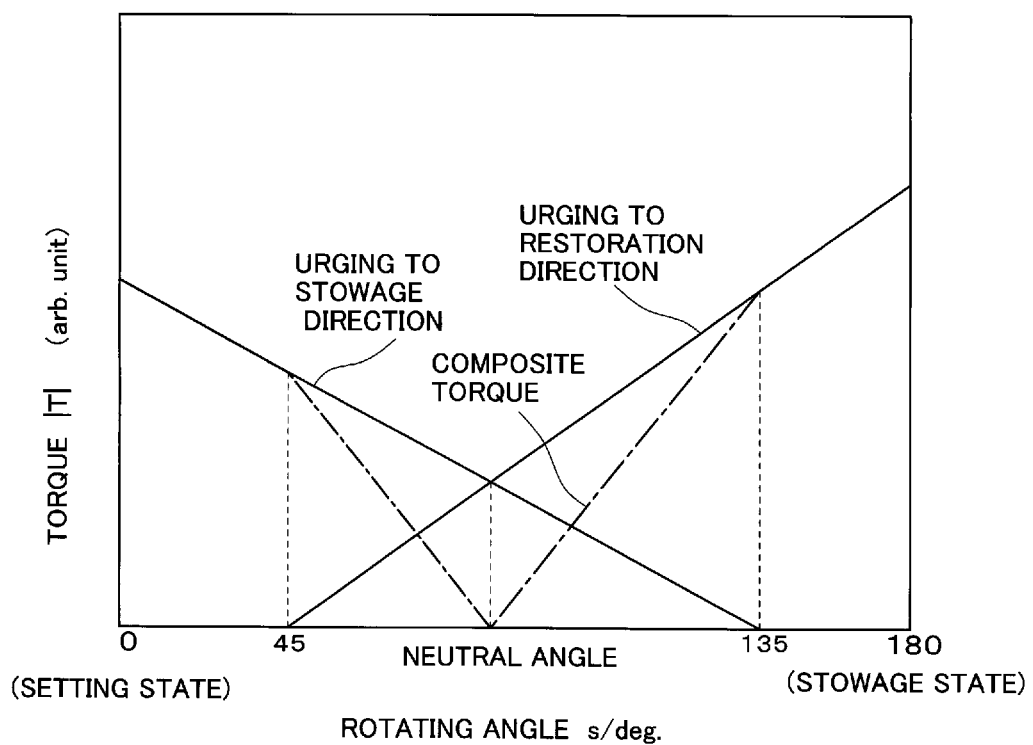
FIG. 7 is a graph showing the relationship between rotating angle and torque in a second working example relating to a seat support part in accordance with one embodiment of the present invention.

FIG. 7 shows the relationship between rotating angle and torque in a second working example relating to the seat support part 26.

In the second working example, the configuration is such that one urging spring for urging to the restoration rotating direction and one urging spring for urging to the stowage rotating direction are provided.

In this working example, since the urging spring for urging to the restoration rotating direction is disposed to be locked to the rear side of the rotating shaft bracket 26b at a rotating angle of 45°, the urging spring exerts an urging force at rotating angles of 45 to 180°. Also, since the urging spring for urging to the stowage rotating direction is disposed to be locked to the front side of the rotating shaft bracket 26b at a rotating angle of 135°, the urging spring can exert an urging force at rotating angles of 0 to 135°. Since the restoring operation requires a larger operating force than the stowing operation, as the spring for urging to the restoration rotating direction, a spring that attains a higher torque than that of the spring for urging to the stowage rotating direction is used.

By the above-described configuration, in both of the operation to the stowage direction and the operation to the restoration direction, a large urging force is obtainable in the starting-up operation immediately after the operation. Also, since the urge direction of the urging spring is reversed with the neutral angle at which the integrated value of torque T of the urging spring becomes 0 being a boundary, the increase in rotating speed is restrained.

Figure 8:
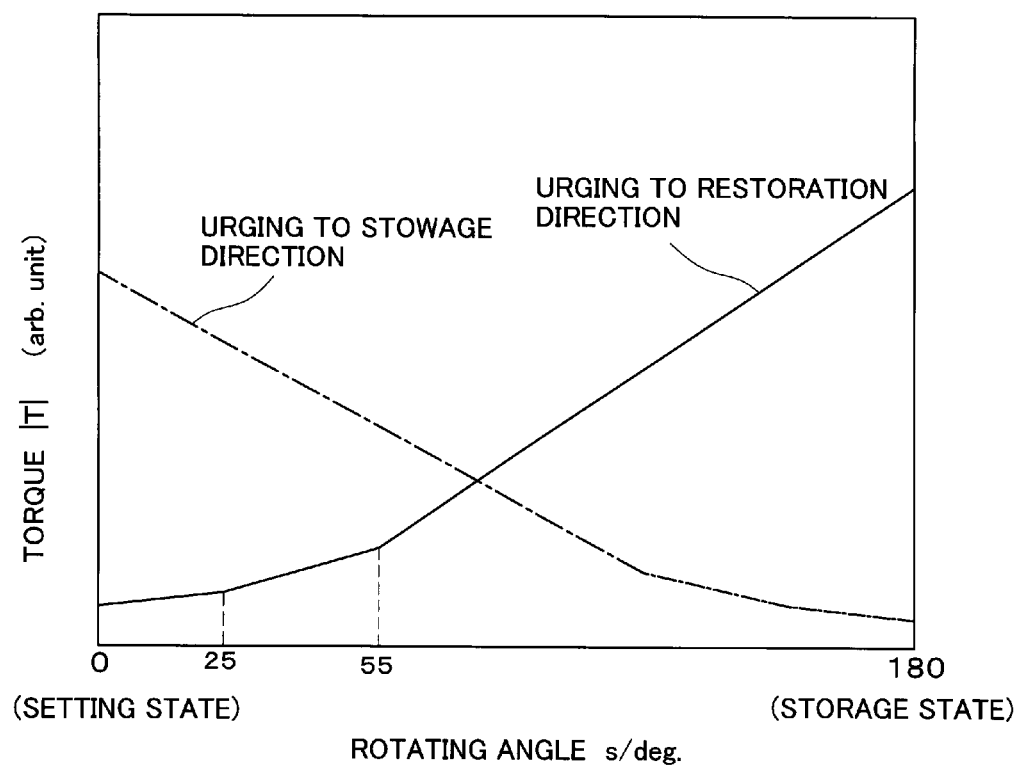
FIG. 8 is a graph showing the relationship between rotating angle and torque in a third working example relating to a seat support part in accordance with one embodiment of the present invention.
Figure 9:
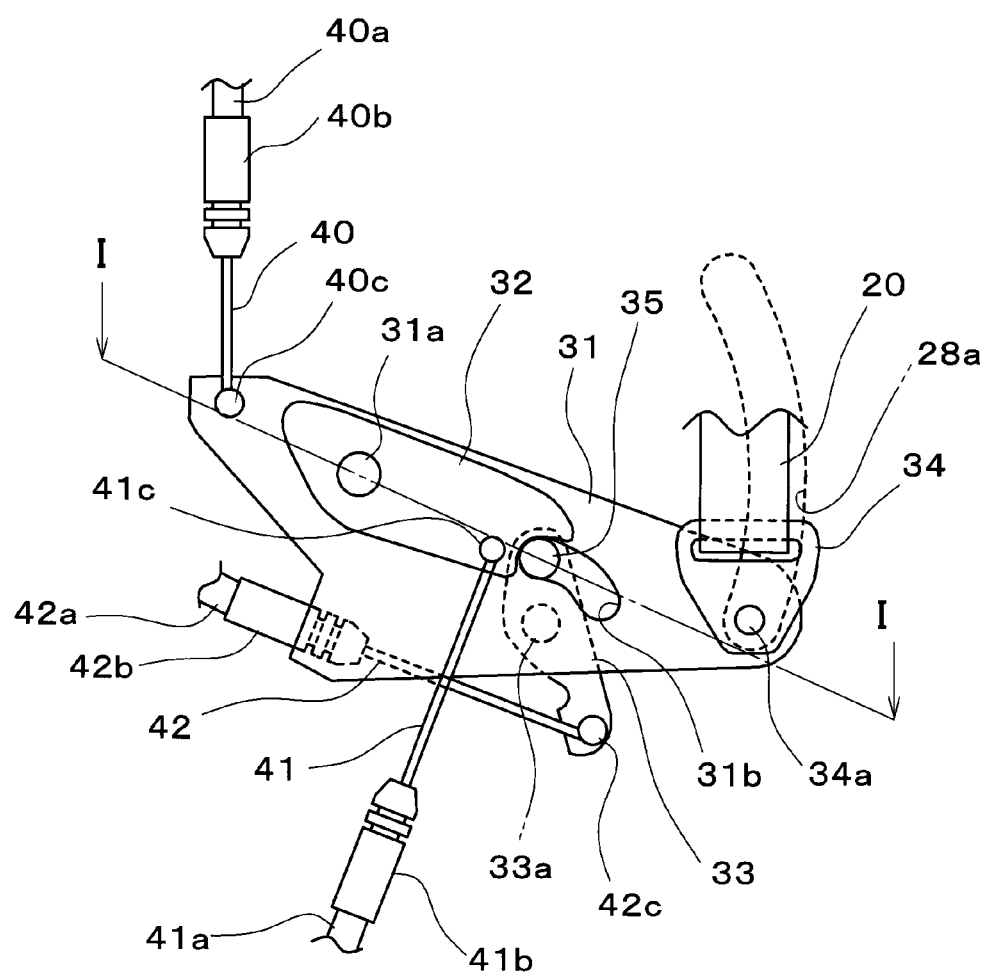
FIG. 9 is an enlarged explanatory side view of a link mechanism in accordance with one embodiment of the present invention.
Figure 10:
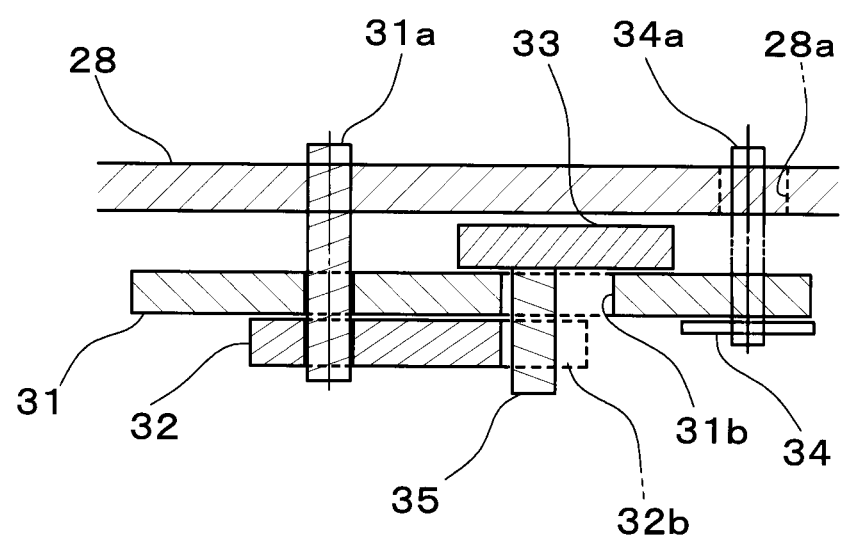
FIG. 10 is a sectional view taken along the line I-I of the link mechanism shown in FIG. 9 in accordance with one embodiment of the present invention.
Figure 11:
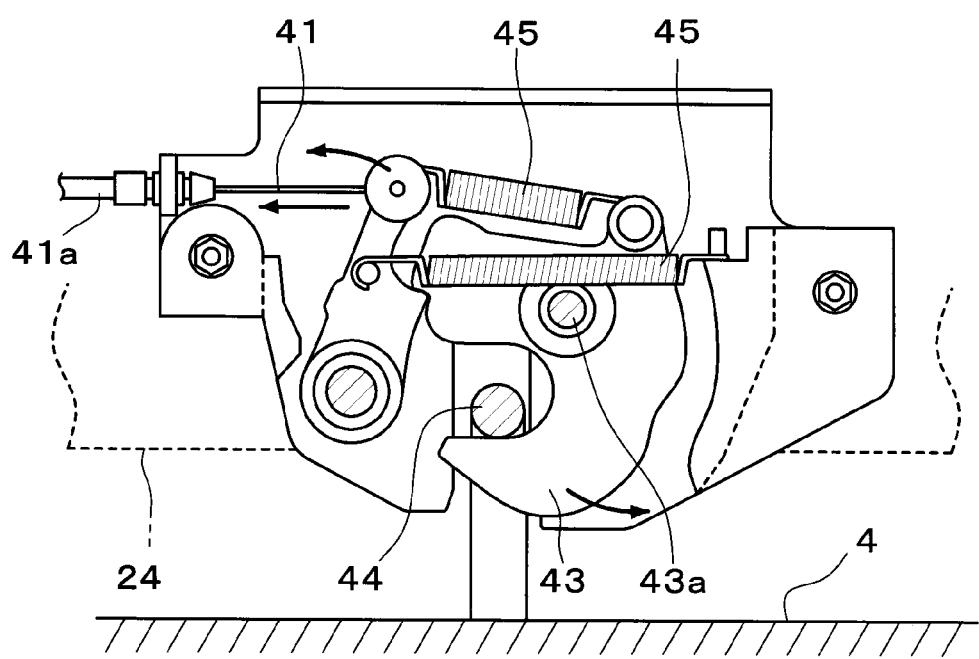
FIG. 11 is a schematic explanatory side view of a locking part of a front leg in accordance with one embodiment of the present invention.

FIG. 8 shows the relationship between rotating angle and torque in a third working example relating to the seat support part 26.

In the third working example, the configuration is such that the configuration in the first working example shown in FIGS. 5 and 6 is also provided in the stowage rotating direction. In this configuration, three springs for urging to the restoration rotating side and three springs for urging to the stowage rotating side (a total of six springs) are provided in the seat support part 26. However, as the urging spring for urging to the stowage rotating side, a spring having a smaller urging force than that of the urging spring for urging to the restoration rotating side is provided.

The configuration may be such that the urging springs for urging to the restoration rotating side are provided in the seat support part 26, and the urging springs for urging to the stowage rotating side are provided on the seat support part 25 side.

By providing the plurality of urging springs for urging to both the rotating directions in this manner, a sense of operation that is smoother and gives a sense of security is obtained.

By increasing the urging forces in the setting state and the stowage state, the seat cushion 11 jumps up by releasing the locking to the vehicle floor 4 (the stowage recess 5) side. By this jumping-up action, the operation load is further reducible, and the safety at the operation time is improved because the rotating in the jump-up direction is seen visually.

Next, the configuration of the link mechanism 30 is explained with reference to FIGS. 9 to 13.

The link mechanism 30 is connected to the strap 20 operated at the time of stowage and restoration of the seat S, and has a function of appropriately releasing the rotating of the reclining mechanism 27 and the locked state of the front leg 14 to the vehicle body floor 4 in association with the operation of the strap 20 and the state of the seat S. As described above, the link mechanism 30 is formed on the back plate 28.

The link mechanism 30 has a first link member 31, a second link member 32, and a third link member 33, which are rotatably supported, and a power transmitting member is connected to each of the link members. These link members are operated in association with each other according to the state between the power transmitting members and the operation between the link members.

As the power transmitting members, there are provided a reclining releasing wire 40 connected to the reclining mechanism 27, the strap 20, a leg releasing wire 41 connected to the locking claw 43 of the front leg 14 (front leg frame 24), and a cancel wire 42 for detecting the falling-down state (folded state) of the seat back 12.

The first link member 31 is a substantially inverse triangular member that is flat in the right and left direction. To locking parts 34a and 40c provided on both end part sides of the first link member 31, the reclining releasing wire 40 serving as a power transmitting member and the strap 20 are locked, respectively, the strap 20 being locked via a strap connecting member 34. The first link member 31 is rotatably supported on the back plate 28 by a first shaft part 31a provided between the locking parts 40c and 34a.

Also, between the first shaft part 31a and the locking part 34a, an arc-shaped elongated hole 31b is formed to draw a part of a circle concentric with a second shaft part 33a, described below.

Hereunder, the other end part sides of the reclining releasing wire 40 locked to the first link member 31 and the strap 20 are explained.

Figure 12:
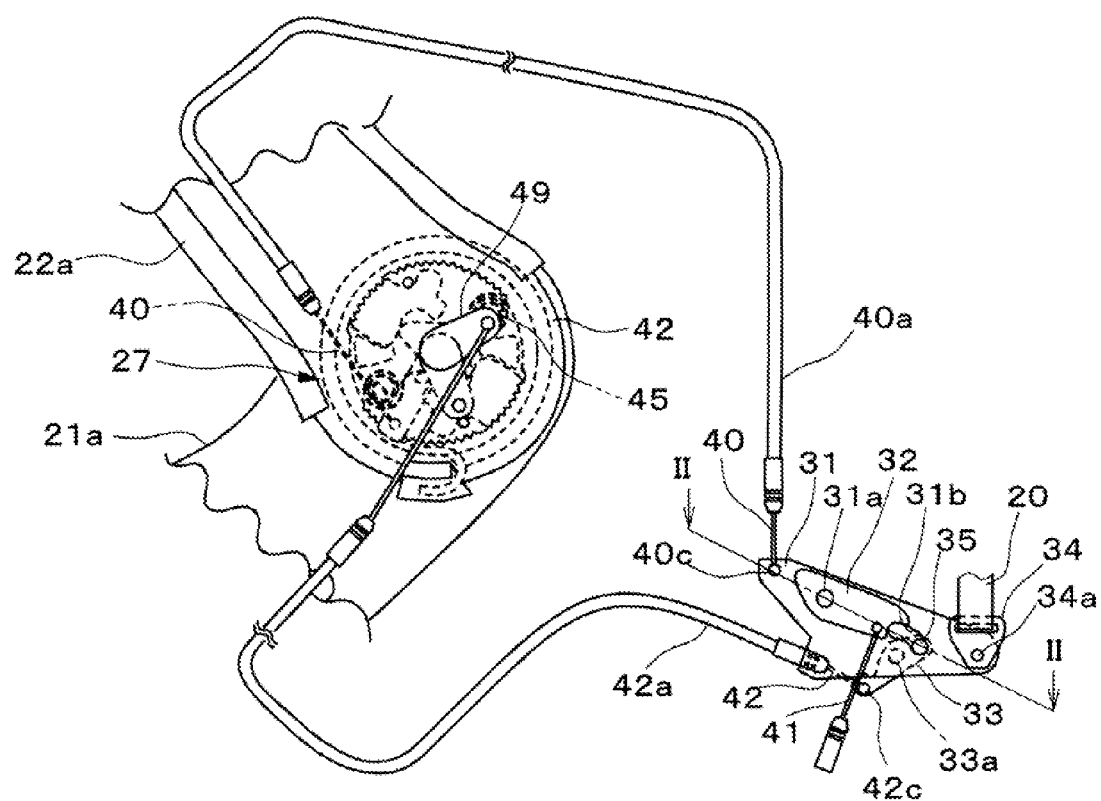
FIG. 12 is a schematic explanatory side view of a link mechanism at the time when a seat back is folded in accordance with one embodiment of the present invention.
Figure 13:
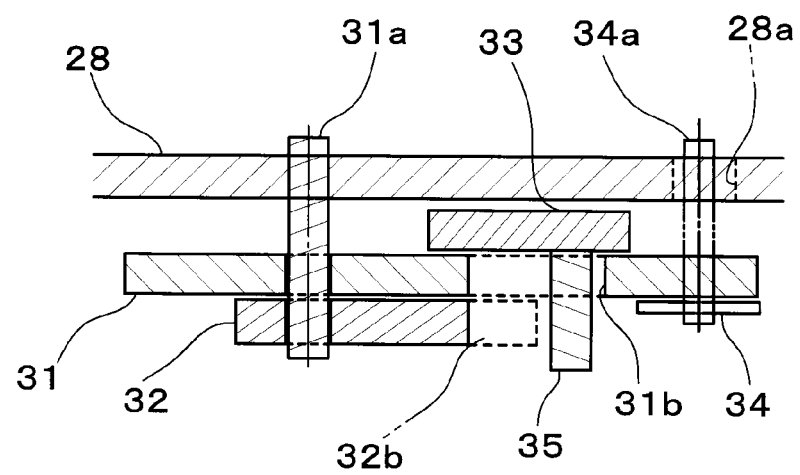
FIG. 13 is a sectional view taken along the line II-II of the link mechanism shown in FIG. 12 in accordance with one embodiment of the present invention.

As shown in FIG. 12, the other end part side of the reclining releasing wire 40 locked to the locking part 40c on the end part side of the first link member 31 is guided by a reclining releasing cable 40a and is connected to the reclining mechanism 27 serving as the reclining assembly that releases the locked state of rotating of the seat back 12.

The reclining mechanism 27 is a mechanism for releasing the locked state of rotating of the reclining mechanism 27 to make the seat back 12 in a rotatable state when the reclining releasing wire 40 is pulled to the link mechanism 30 side by the operation of the link mechanism 30.

The other end part side of the strap 20 connected to the first link member 31 via the strap connecting member 34 is extended from the strap outlet part 20a provided on the back surface of the seat back 12 to the outside of the seat back 12 to make the operation performed by the passenger easy. In association with the operation of the strap 20 performed by the passenger, the power (the operating force of the passenger) is transmitted to the first link member 31.

That is to say, when the strap 20 is operated, the first link member 31 is rotated, and the locking of the reclining mechanism 27 is released.

The second link member 32 is a substantially rectangular member, and is disposed on the first link member 31.

The end part side on which the reclining releasing wire 40 is mounted is rotatably supported to be rotatable coaxially with the first link member 31 by the first shaft part 31a. On the other end part side, a locking recess 32b that is in contact with a locking protrusion 35, described below, is formed. Between the first shaft part 31a and the locking recess 32b, a locking part 41c to which the leg releasing wire 41 is locked is formed.

Hereunder, the other end part side of the leg releasing wire 41 locked to the second link member 32 is explained.

The other end part side of the leg releasing wire 41 locked to the locking part 41c of the second link member 32 is guided by a leg releasing cable 41a and is connected to a leg locking releasing mechanism serving as engaging and disengaging elements. The leg locking releasing mechanism is a mechanism that is formed in the front leg 14, and releases the locking to the leg striker 44 on the vehicle body floor 4 side by turning the locking claws 43 connected to the leg releasing wire 41 around a locking claw rotating shaft 43a when the leg releasing wire 41 is pulled to the link mechanism 30 side by the operation of the link mechanism 30. When the leg locking releasing mechanism is released, the seat cushion 11 becomes rotatable in the front and rear direction.

The rotating of the locking claw 43 is always urged by an urging spring 45 in the direction such that the locking state to the leg striker 44 is maintained.

The third link member 33 is a substantially rectangular member, being disposed between the first link member 31 and the back plate 28, and the central part thereof is rotatably supported on the first link member 31 side by the second shaft part 33a.

To the lower end part side of the third link member 33, the cancel wire 42 is locked via a locking part 42c.

On the upper end part side, the cylindrical locking protrusion 35 serving as a locking part is formed. This locking protrusion 35 is inserted through the arc-shaped elongated hole 31b formed in the first link mechanism 31 and is in contact with the locking recess 32b of the second link member 32, so that the second link member 32 is locked to rotate together with the first link member 31. The locking protrusion 35 is formed to have an outside diameter slightly smaller than the width of the elongated hole 31b. On the other hand, the elongated hole 31b is formed in an arcuate shape to draw a part of a circle concentric with the second shaft part 33a as described above. Therefore, the configuration is made such that the locking protrusion 35 moves along the elongated hole 31b along with the rotating of the third link member 33.

Hereunder, the other end part side of the cancel wire 42 locked to the third link member 33 is explained.

As shown in FIG. 12, the other end part side of the cancel wire 42 locked to the locking part 42c of the third link member 33 is guided by a cancel cable 42a and is connected to a locking rib 49 formed in the connecting part between the side frame 22a and the back frame support part 21a. The locking rib 49 is a member provided on the reclining mechanism 27, and is mounted to rotate together with the side frame 22a. That is to say, in this embodiment, the other end part of the cancel wire 42 is locked to the locking rib 49. The other end part side of the cancel wire 42 is configured so that the locking rib 49 pulls the locking part 42c formed in the third link member 33 via the cancel wire 42 in the state in which the seat back 12 is folded, and functions as a detector by rotating the third link member 33. That is to say, the reclining assembly has the reclining mechanism 27 and the detector.

In this embodiment, the locking rib 49 locked to the other end part side of the cancel wire 42 is formed on the reclining mechanism 27. However, any other locking part may be used as far as the configuration is made such that the cancel wire 42 is operated in the state in which the seat back 12 is folded over the seat cushion 11. Further, the locking rib 49 may be formed in a portion separate from the reclining mechanism 27. In this case, the reclining assembly is configured so that the reclining mechanism 27 and the detector are provided in separate portions.

In the state in which the third link member 33 is not rotating, the second link member 32 is locked to the first link member 31 by the locking protrusion 35, and can pull the leg releasing wire 41 by rotating along with the rotating of the first link member 31.

When the third link member 33 is rotated, the locking protrusion 35 fixed to the third link member 33 moves along the elongated hole 31b. By the movement of the locking protrusion 35, the locking recess 32b is does not contact the locking protrusion 35. Therefore, the locking of rotating of the first link member 31 and the second link member 32 is released.

At this time, a state in which the second link member 32 does not rotate even if the first link member 31 is rotated by the operation of the strap 20 is formed, and the leg releasing wire 41 having been locked to second link member 32 is not pulled even if the first link member 31 rotates.

That is to say, the configuration is such that in the state in which the seat back 12 is folded, even if the strap 20 is pulled, the locking of the front leg 14 to the vehicle body floor 4 is not released. In other words, by rotating of the third link member 33, a state in which the second link member 32 cannot rotate is formed.

On the locking releasing mechanism side (the other end part side of the link mechanism 30) to which the reclining releasing wire 40 and the leg releasing wire 41 are connected, the urging spring 45 is provided to always urge the reclining releasing wire 40 and the leg releasing wire 41 to the direction of holding in the locked state. Therefore, in the state in which the passenger does not operate the strap 20, concerning the first link member 31 and the second link member 32 as well, the rotating of the link mechanism 30 is urged to the direction such that the strap 20 is always pulled downward via the strap connecting member 34.

The locking part 34a of the strap connecting member 34 provided on the first link member 31 rotatably supports the strap connecting member 34 on the first link member 31 to be rotatable, and also the other end side thereof is inserted through a guide hole part 28*a* formed in the back plate 28. The guide hole part 28*a* is formed in an arcuate shape to draw a part of a circle concentric with the first shaft part 31*a*, so that the locking part 34*a* can move in the guide hole part 28*a* along with the rotating of the first link member 31. Also, by adjusting the length of the guide hole part 28*a*, the upper and lower limits of rotating amount of the first link member 31 can be set.

End part members 40*b* and 41*b*, which are end parts on the link mechanism 30 side of the reclining releasing cable 40*a* and the leg releasing cable 41*a* for guiding the reclining releasing wire 40 and the leg releasing wire 41, respectively, are fixed onto the back plate 28 by locking members (not shown).

An end part member 42*b* on the link mechanism 30 side of the cancel cable 42*a* for guiding the cancel wire 42 is fixed to the first link mechanism 31 by a locking member (not shown).

Figure 14:
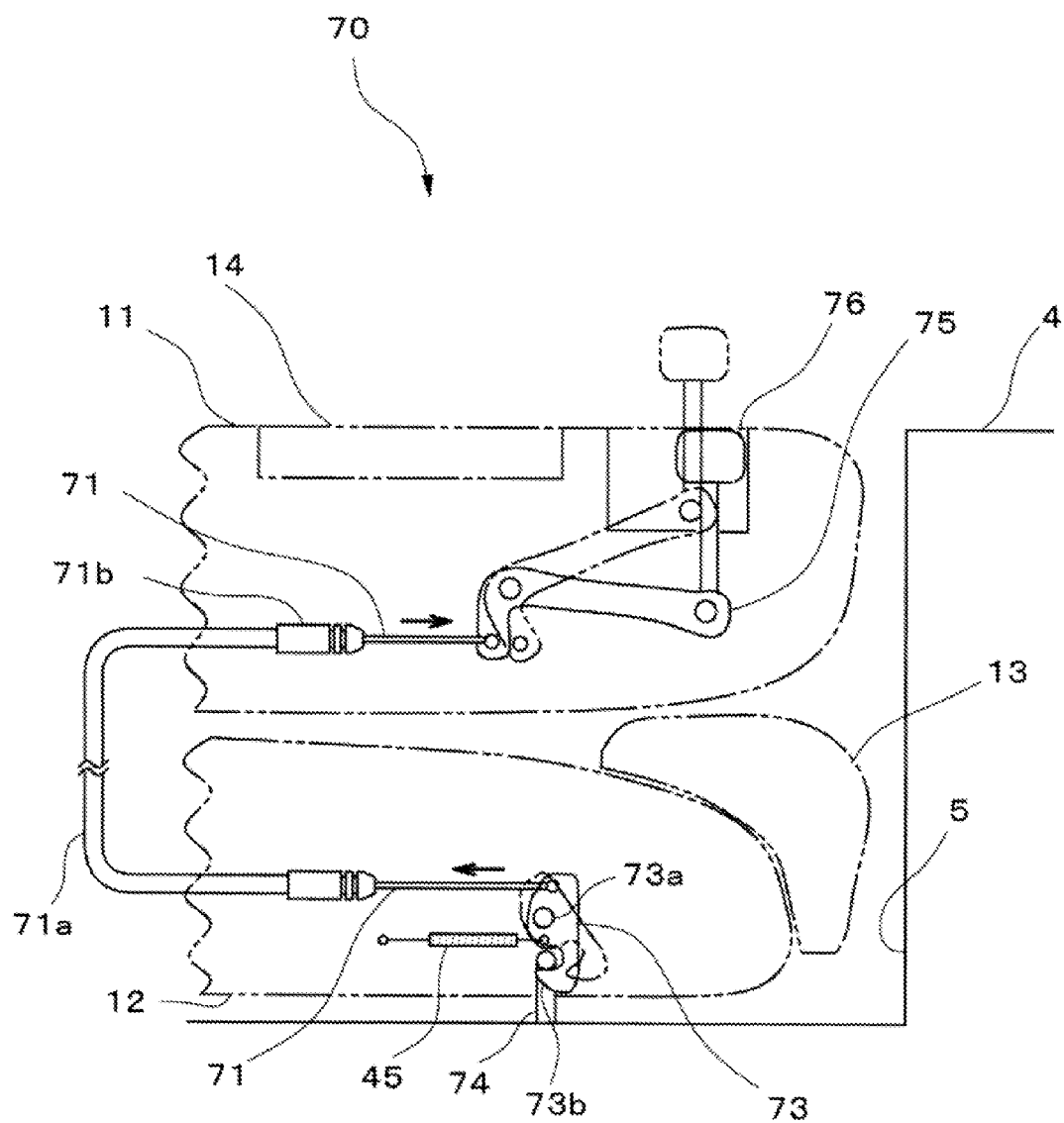
FIG. 14 is a schematic explanatory side view of a stowage locking part in accordance with one embodiment of the present invention.

FIG. 14 is an enlarged explanatory view of the stowage locking mechanism 70.

The stowage locking mechanism 70, which is a locking part for holding the seat S in a state of being stowed in the stowage recess 5, locks a locking claw 73 provided on the back surface side of the seat back 12 to a stowage striker 74 provided in the bottom part of the stowage recess 5.

The stowage locking mechanism 70 is made up of a stowage locking releasing wire 71 for operating the locking claw 73, an urging spring 45 for urging the locking claw 73 to the side of holing the locking, a grip 76 serving as a locking releasing element, and a stowage link member 75 for connecting the grip 76 to the stowage locking releasing wire 71.

When the seat S is stowed, the seat S is locked by being pressed against the stowage recess 5. That is to say, a tilting locking claw tip end part 73*b* comes into contact with the storage striker 74, and the locking claw 73 turns around a locking claw rotating shaft 73*a* to a position that is lockable to the stowage striker 74.

In order to release the locking, the grip 76 provided on the seat cushion 11 side is pulled upward, whereby the locking of the seat back 12 to the storage recess 5 is released. The configuration is made such that by pulling the grip 76, the stowage locking releasing wire 71 is pulled via the stowage link member 75, whereby the locking claw 73 is turned in the locking releasing direction.

Next, the stowing and restoring operation of the seat S of this embodiment and the operation of the link mechanism 30 are explained with reference to FIGS. 15 to 18. The explanation of the operation of the seat S shown in FIGS. 15 and 17 was given in the first working example relating to the seat support part 26.

First, the stowing operation of the seat S is explained with reference to FIGS. 15A to 15E.

Figure 15A:
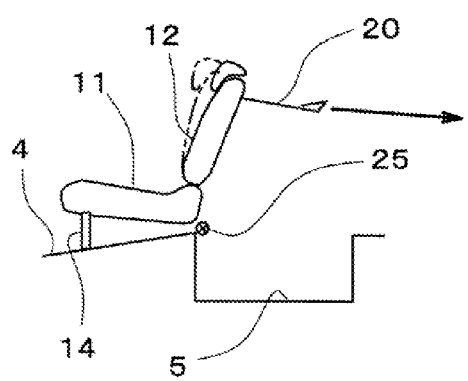
FIGS. 15A-E are explanatory side views showing an operation procedure at the time of stowing operation of a stowable vehicle seat in accordance with one embodiment of the present invention.

FIG. 15A shows the state in which the strap 20 is pulled to the rear in a seat setting state. When the passenger pulls the strap 20 to the rear, the locking of the reclining mechanism 27 is released.

At this time, the seat back 12 to which the strap 20 is mounted is being urged to the front direction by the spiral spring 51 mounted on the reclining mechanism 27. When the strap 20 is pulled against the urging direction, the locking of the locking claws 43 of the front leg 14 is released by a stress lower than the stress that folds the seat back 12 to the rear.

Figure 15B:
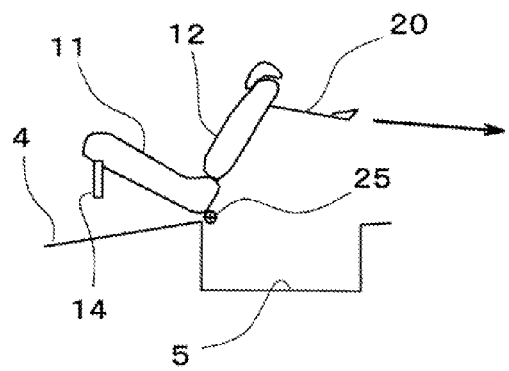

FIG. 15B shows the state in which the locking of the locking claws 43 of the front leg 14 has been released. The locking of the locking claws 43 of the front leg 14 is released, so that the seat S can be rotated to the rear.

Figure 15C:
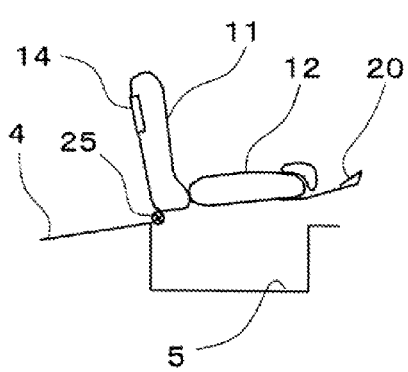
Figure 15D:
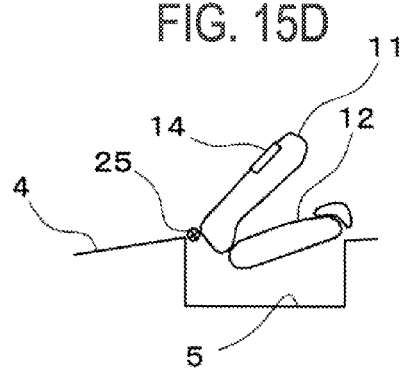

FIGS. 15C and 15D show the state in which the rearward rotating of the seat S is advanced. By pulling the strap 20, the seat S is rotated so that the center of gravity of the seat S goes beyond the middle point, and thereafter is rotated to the rear by its own weight, reaching a stowed state. At this time, the rearward rotating speed of the seat S is decreased by the spiral springs 46, 47, and 48 mounted on the seat support part 26, so that the shock caused by the stowage into the stowage recess 5 is buffered.

The front leg 14 is folded to the seat cushion 11 side by its own weight along with the rotating of the seat S.

Figure 15E:
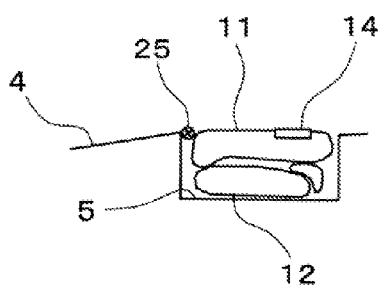

FIG. 15E shows the stowage state of the seat S. In this state, in the stowage locking mechanism 70, the locking claw 73 disposed on the back surface of the seat back 12 is locked to the stowage striker 74 provided in the bottom part of the stowage recess 5. The stowage locking mechanism 70 is locked by pressing the seat S against the stowage recess 5. In this state, the opening part of the stowage recess 5 forms a flat surface integrally with the back surface of the seat cushion 11, so that a spacious cargo room is secured.

The operation of the link mechanism at the time of the above-described stowing operation of the seat S is explained with reference to FIGS. 16A-16C.

FIG. 16A shows the state of the link mechanism 30 at the time when the seat S is set (refer to FIG. 15A). This state is a state before the strap 20 is operated by the passenger. This state of the link mechanism 30 is referred to as the original position.

FIG. 16B shows the state of the link mechanism 30 at the time when the locking of the reclining mechanism 27 is released (refer to FIG. 15B). This state is a state in which the strap 20 is pulled slightly to the rear. The first link member 31 is rotated in the direction of being pulled by the operation of the strap 20. Therefore, the reclining releasing wire 40 is pulled with the rotating, and the locking of the reclining mechanism 27 is released. At this time, the seat back 12 is in a state of being raised with respect to the seat cushion 11. Therefore, the cancel wire 42 is not pulled, and the second link member 32 rotates together with the first link member 31, whereby the leg releasing wire 41 is also pulled. However, setting is made so that the locking of the locking claws 43 for connecting the front leg 14 to the vehicle body floor 4 side is not released by the pulling amount in this state, so that the locking of the leg is kept.

FIG. 16C shows the state of the link mechanism 30 at the time when the locking of the reclining mechanism 27 and the locking claws 43 of the front leg 14 has been released (refer to FIGS. 15C and 15D), showing the state in which the strap 20 is further pulled. Compared with the state shown in FIG. 16B (see FIG. 15B), the first link member 31 is also rotated greatly by strongly pulling the strap 20. With this rotating, the reclining releasing wire 40 and the leg releasing wire 41 are pulled further. At this time, the locking of the leg is released.

After the seat S has been stowed, when the operation of the strap 20 is stopped, the state shown in FIG. 16A is restored by the urging spring 45 mounted on the locking releasing mechanism side (the other end part side of the link mechanism 30) to which the reclining releasing wire 40 and the leg releasing wire 41 are connected. However, since the seat back 12 is stowed in a state of being folded over the seat cushion 11 (see FIG. 15E), the cancel wire 42 is pulled, and the third link member 33 is still held in a state of being rotated.

Next, the restoring operation of the seat S is explained with reference to FIGS. 17A-17E.

Figure 17A:
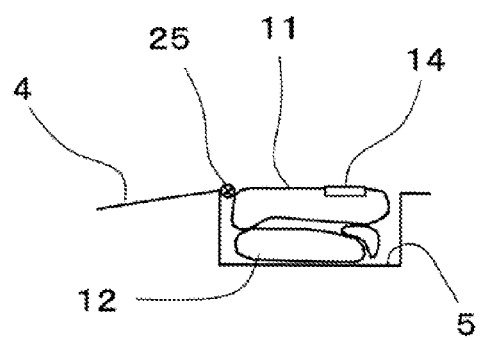
FIGS. 17A-E are explanatory side views showing an operation procedure at the time of restoring operation of a stowable vehicle seat in accordance with one embodiment of the present invention.

FIG. 17A shows the state in which the seat S has been stowed by being locked by the stowage locking mechanism 70.

Figure 17B:
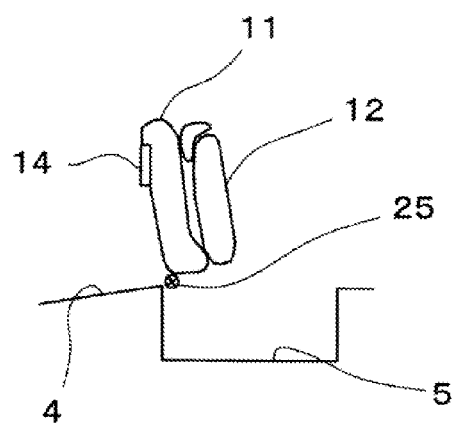

FIG. 17B shows the state at the time when the seat S is rotated to the front. In this state, the seat S is urged to the restoration rotating direction by the spiral springs 46, 47, and 48 mounted to the seat support part 26, so that the operation load is reduced.

With the forward rotating of the seat S, the front leg 14 is rotated by its own weight and is deployed downward. At this time, since the locking on the external hook 47a and 48a sides is released successively as the rotating advances, the urging forces of the spiral springs 46, 47, and 48 mounted to the seat support part 26 weaken, so that the frontward rotating speed is not increased.

Figure 17C:
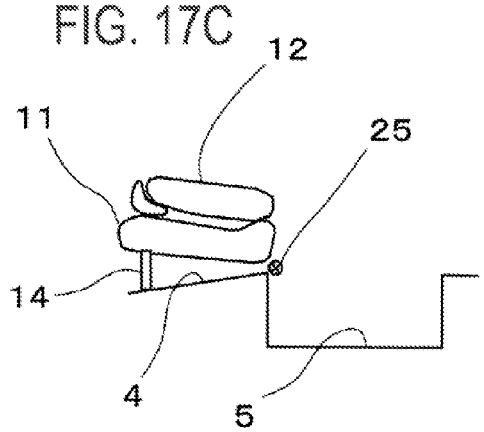

FIG. 17C shows the state in which the locking claws 43 of the front leg 14 of the seat S have been locked to the vehicle body floor 4 side. The locking claw 43 is locked to the leg striker 44 on the vehicle body floor 4 side by the pressing caused by the own weight of the seat S.

Figure 17D:
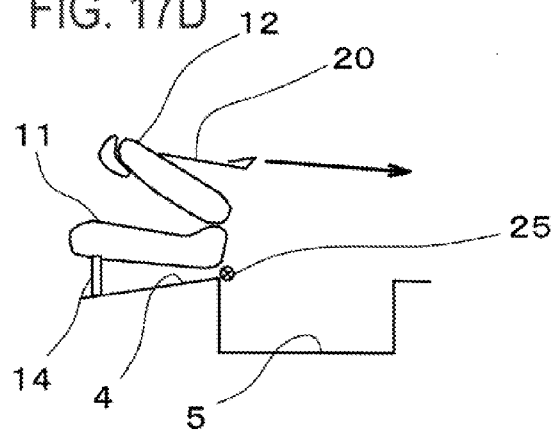

FIG. 17D shows the operation for pulling the strap 20 to the rear from the state in which the locking claws 43 of the front leg 14 of the seat S are locked to the leg striker 44 on the vehicle body floor 4 side.

Figure 17E:
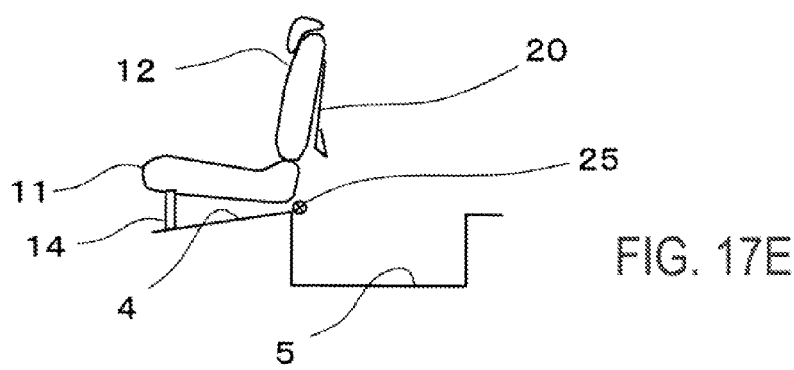

FIG. 17E shows the state in which the restoring operation of the seat S has been finished.

After the seat S in the stowage state in which the seat back 12 is folded has been rotated to the front, the seat S can be restored merely by pulling the strap 20 to the rear by the passenger.

Figure 18A:
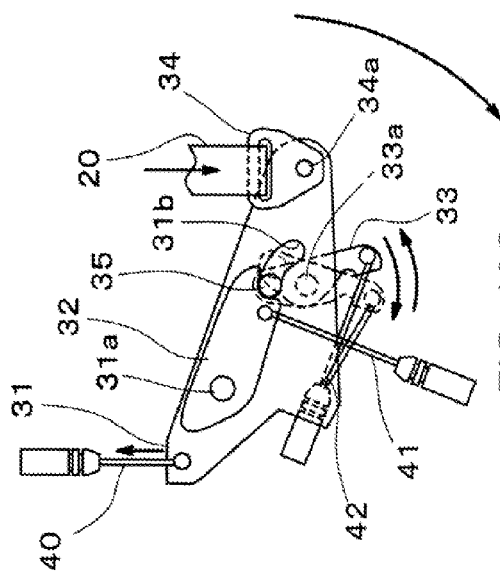
FIGS. 18A-C are explanatory side views of operation of a link mechanism at the time of restoring operation of a stowable vehicle seat in accordance with one embodiment of the present invention.

The operation of the link mechanism at the time of the above-described restoring operation of the seat S is explained with reference to FIGS. 17 and 18. FIG. 18A shows the state of the link mechanism 30 at the stage at which the seat S is rotated from the stowage state of the seat S (see FIG. 17A) and the locking claws 43 are locked to the vehicle body floor 4 side (see FIG. 17C). This stage is a stage before the strap 20 is operated by the passenger. Since the operation is performed in the state in which the seat back 12 is folded or in the neutral position of urging, the state in which the cancel wire 42 is pulled and the third link member 33 is rotated is held.

Figure 18B:
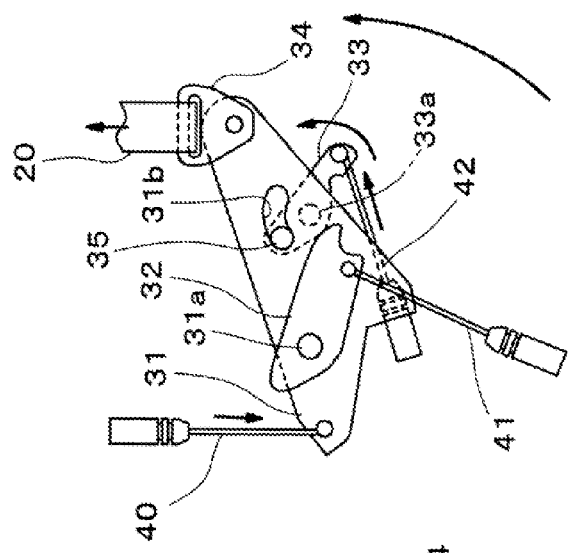

FIG. 18B shows the stage at which the strap 20 is pulled slightly to the rear to raise the seat back 12 (see FIG. 17D). By the operation of the strap 20, the first link member 31 is rotated. With this rotating, the reclining releasing wire 40 is pulled, and thereby the locking of the reclining mechanism 27 is released, so that the seat back 12 can be rotated to the rear. At this time, since the locking protrusion 35 moves together with the third link member 33, even if the first link member 31 rotates, the second link member 32 is not locked to the first link member 31 and is in a state of being unable to rotate.

Also, with the raising of the seat back 12, the rotating amount of the third link member 33 decreases. However, the third link member 33 rotates exceeding the rotating range in which the locking protrusion 35 comes into contact with the second link member 32, so that the locking recess 32b of the second link member 32 is kept in a state of not being locked to the first link member 31. Therefore, the state in which the locking of the locking claws 43 for connecting the front leg 14 to the vehicle body floor 4 side is not released is held, so that the seat back 12 can be raised with respect to the seat cushion 11 merely by pulling the strap 20.

Figure 18C:
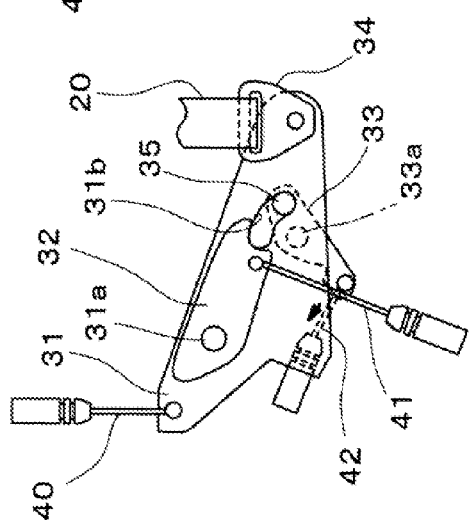

FIG. 18C shows the state in which the restoring operation of the seat S has been finished (see FIG. 17E). When the rearward pulling operation of the strap 20 is stopped, the position of the first link member 31 is also returned to the original position by the urging from the reclining releasing wire 40 and the leg releasing wire 41. At this time, since the seat back 12 is raised with respect to the seat cushion 11, the third link member 33 is in a state of not being pulled by the cancel wire 42. Therefore, even by a minute stress, the third link member 33 can be rotated. The second link member 32 is also returned to the original position again and is locked to the first link member 31, and the link members of the link mechanism 30 are restored to the state of original position.

By using the spiral springs 46, 47, and 48, the other end part side of which is locked at different predetermined angles, the urging force can be changed to several stages according to the rotating angle. Therefore, the operation can be performed smoothly, and a sense of security at the time of operation can be improved.

In this embodiment, the third-row vehicle seat divided into the right and left has been explained as a specific example. However, the seat type is not limited to this type. The same configuration can be applied to a long bench type seat formed integrally, a passenger seat adjoining the driver's seat, and any other rear seat.

Also, in this embodiment, the stowable vehicle seat S in which the stowing and restoring operation element is integrated into the strap 20 has been explained. However, the present invention can be applied to a seat having a strap and a lever as the operating elements.

| TABLE OF REFERENCE CHARACTERS | |
|---|---|
| S, S1 | seat |
| F | seat frame |
| S1 | right seat |
| S2 | left seat |
| 4 | vehicle body floor |
| 5 | stowage recess |
| 11 | seat cushion |
| 12 | seat back |
| 13 | headrest |
| 14 | front leg |
| 20 | strap |
| 20a | strap outlet part |
| 21 | seat cushion frame |
| 21a | back frame support part |
| 22 | seat back frame |
| 22a | side frame |
| 22b | central frame |
| 23 | pillar support part |
| 24 | front leg frame |
| 25, 26 | seat support part |
| 25a, 26a | rotating shaft |
| 25b, 26b | rotating shaft bracket |
| 26c | locking pin |
| 27 | reclining mechanism |
| 28 | back plate |
| 28a | guide hole part |
| 30 | link mechanism |
| 31 | first link member |
| 31a | first shaft part |
| 31b | elongated hole |
| 32 | second link member |
| 32b | locking recess |
| 33 | third link mechanism |
| 33a | second shaft part |
| 34 | strap connecting member |
| 34a, 40c, 41c, 42c | locking part |
| 35 | locking protrusion |
| 40 | reclining releasing wire |
| 40a | reclining releasing cable |
| 40b, 41b, 42b | end part member |
| 41 | leg releasing wire |
| 41a | leg releasing cable |
| 42 | cancel wire |
| 42a | cancel cable |
| 43, 73 | locking claw |
| 43a, 73a | locking claw rotating shaft |
| 73b | locking claw tip end part |
| 44 | leg striker |
| 45 | urging spring |
| 46, 47, 48, 51 | spiral spring |
| 49 | locking rib |
| 46a, 47a, 48a | external hook |

-continued

TABLE OF REFERENCE CHARACTERS

| 70 | stowage locking mechanism |
| 71 | stowage locking releasing wire |
| 71a | stowage locking cable |
| 74 | stowage striker |
| 75 | stowage link member |
| 76 | grip |

The invention claimed is:

1. A stowable vehicle seat comprising:
a first seat support for rotatably supporting one end part side of a seat cushion;
a seat back foldable over the seat cushion via a reclining assembly;
a second seat support provided on an other end part side of the seat cushion;
an engaging and disengaging elements that engage and disengage the second seat support with and from a vehicle body floor side; and
an urging element mounted to the first seat support that urge the seat cushion to an upright seat position, which is a restoration rotating direction,
wherein
the urging element comprises a plurality of urging springs, each of the urging springs having one end part always locked to the seat cushion side and an other end part engageable with and disengageable from the vehicle body floor side, and each of the urging springs having a same urging direction;
the other end part of each of the urging springs engages with the vehicle body floor side when a rotating angle of the seat cushion is at a predetermined angle, the predetermined angle for each of the urging springs being different; and
the urging force of the urging element is changed stepwise according to the rotating angle of the seat cushion.

2. The stowable vehicle seat according to claim 1, wherein the urging element comprises:
a first urging spring, the other end part of which is engaged with the vehicle floor side at a first predetermined angle;
a second urging spring, the other end part of which is engaged with the vehicle floor side at a second predetermined angle; and
a third urging spring, the other end part of which is engaged with the vehicle floor side at a third predetermined angle,
the first predetermined angle being 0 degrees;
the second predetermined angle being in an angle range of 20 to 30 degrees, and
the third predetermined angle being in an angle range of 50 to 60 degrees.

3. The stowable vehicle seat according to claim 1, wherein the first seat support has one locking member, and the other end part of each of the plurality of urging springs is locked to the same one locking member.

4. The stowable vehicle seat according to claim 3, wherein the locking member is provided on the vehicle body floor side in the first seat support.

5. The stowable vehicle seat according to claim 1, wherein the other end of each spring is a free end.

* * * * *